UNITED STATES PATENT OFFICE.

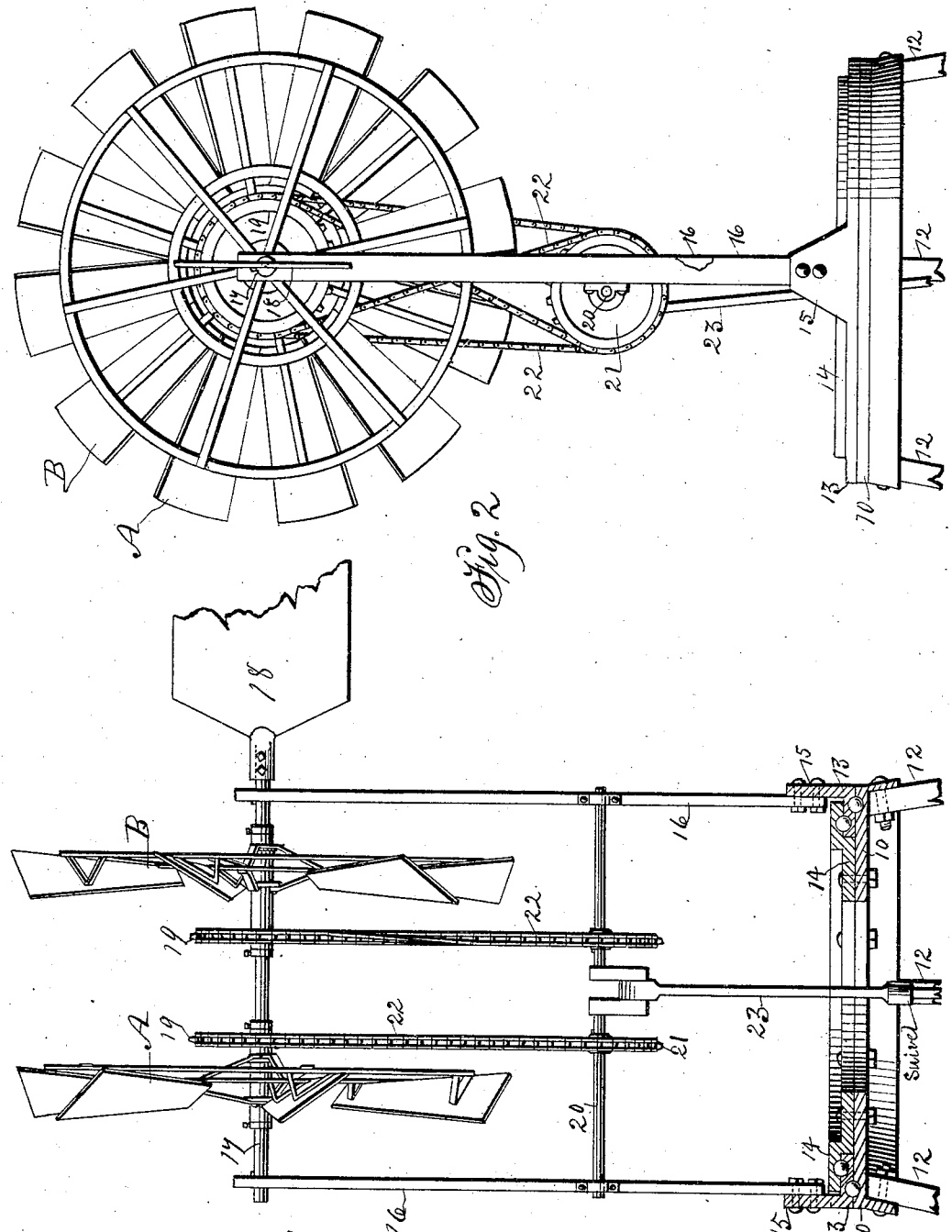

ORLANDO KIRKHAM, OF MARSHALLTOWN, IOWA.

DUPLEX WIND-MOTOR.

No. 844,454. Specification of Letters Patent. Patented Feb. 19, 1907.

Application filed September 17, 1906. Serial No. 335,024.

*To all whom it may concern:*

Be it known that I, ORLANDO KIRKHAM, a citizen of the United States, residing at Marshalltown, in the county of Marshall and State of Iowa, have invented a new and useful Duplex Wind-Motor, of which the following is a specification.

My object is to increase the power of a wind-motor; and my invention consists in mounting two wind-wheels in juxtaposition and combining mechanism therewith for collecting and transmitting power and motion therefrom to extraneous machinery, as hereinafter set forth, pointed out in my claims, and illustrated in the accompanying drawings, in which—

Figure 1 shows the top of a tower in section, a frame for supporting two wind-wheels, and power-transmitting mechanism rotatably mounted in the frame and combined as required for practical operation. Fig. 2 is a side view that shows the two wind-wheels in position relative to each other as required to be simultaneously engaged by the wind and rotated in reverse directions, so that each wheel will catch and deliver wind-power at the same time to a rotatable crank-shaft and reciprocating rod for transmitting power to a pump or other extraneous machine.

The numeral 10 designates the top of a tower, preferably cast-iron, fixed on posts 12, as shown, or in any suitable way. It has a central opening large enough for a person to pass through and a circular groove in its top face in which are placed a plurality of balls as required to support the frame rotatably mounted on the fixed top 10 in ball-bearings.

The circular base 13 of a rotatable frame has a circular groove in its under side to cover the balls in the groove in the top 10 and also has a concentric circular groove in its top to admit balls. A circular plate 14, having a circular groove in its under side, is fitted and fixed to the top 10 to admit and cover the balls in the groove in the top of the base 13 of the rotatable frame, and the base 13 has vertical extensions 15, to which are fixed uprights 16, as shown or in any suitable way, as required for supporting the two wind-wheels and the power collecting and transmitting mechanism.

A shaft 17 is fixed in the top ends of the uprights 16, and a vane 18 is fixed to the end of the shaft. Wind-wheels A and B are loosely mounted on the shaft 17 and have sprocket-wheels 19 fixed to their sides. Their sails are inclined in reverse ways as required to rotate in reverse ways relative to a wind-current and to each other. A crank-shaft 20 is mounted on the uprights 16 of the rotatable frame and sprocket-wheels 21 fixed thereto in alinement with the wheels 19 on the fixed shaft 17 and connected therewith by chains 22. In order to transfer power from the wheel B, that rotates in reverse way to the wheel A, the chain that connects it with the wheel 21 on the rock-shaft 20 is twisted, as shown in Fig. 1. A reciprocating rod 23 is connected with the crank of the shaft 20 for transmitting the power from the wheels A and B jointly as required for advantageously operating a pump or other machine.

In the practical operation of my invention the vane 18 will hold the wheels A and B square to changeable wind-currents, and the two wheels will present their broad sides thereto and successively receive the same wind-current and force as required to jointly operate the crank-shaft 20 and reciprocating rod 23 for transmitting the force of the two wheels and the increase of power for operating extraneous machinery.

Having thus set forth the purposes of my invention and the construction and arrangement of all its parts, the practical operation and utility thereof will be obvious.

What I claim as new, and desire to secure by Letters Patent, is—

1. In a wind-motor, a rotatable frame composed of a rigid base, two uprights fixed to the base and a horizontal shaft fixed to the top ends of the uprights, means to support the rotatable frame and two wind-wheels mounted loosely on the shaft and between the uprights to rotate in reverse ways.

2. In a wind-motor, a rotatable frame composed of a circular base, two uprights fixed to the edge of the circular base, a fixed horizontal shaft at the upper ends of the uprights, means to support the frame, two wind-wheels mounted loosely on the shaft to rotate in reverse ways and a vane fixed to one end of the shaft, to operate as set forth.

3. In a wind-motor, a rotatable frame composed of a circular base, two uprights fixed on the base, a fixed horizontal shaft at the upper end of the uprights, means to support the rotatable base of the frame, two wind-wheels mounted loosely on the shaft to rotate in reverse ways, a vane fixed to one end of the shaft and means for jointly transmitting power from the two wheels in one direction from the wheels as they rotate in reverse directions as set forth.

4. A duplex wind-motor comprising a fixed frame support, a frame rotatably connected with the fixed frame, a shaft fixed to the top of the rotatable frame in a horizontal position, two wind-wheels loosely mounted on the shaft, sprocket-wheels fixed to the sides of the wind-wheels, a vane fixed to one end of the fixed horizontal shaft, a crank-shaft mounted in the rotatable frame below the two wind-wheels, sprocket-wheels fixed to the crank-shaft, chains on the sprocket-wheels and one of the chains twisted and a reciprocating rod connected with the crank of the crank-shaft, to operate as set forth.

ORLANDO KIRKHAM.

Witnesses:
J. C. TUFFREE,
JAS. TUFFREE.